(12) United States Patent
Nishio et al.

(10) Patent No.: US 11,820,055 B2
(45) Date of Patent: *Nov. 21, 2023

(54) FERRITE PARTICLES FOR BONDED MAGNETS, RESIN COMPOSITION FOR BONDED MAGNETS, AND MOLDED PRODUCT USING THE SAME

(71) Applicant: TODA KOGYO CORP., Hiroshima (JP)

(72) Inventors: Yasushi Nishio, Otake (JP); Yasuhiko Fujii, Otake (JP); Hiromitsu Sakurai, Otake (JP)

(73) Assignee: TODA KOGYO CORP., Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/781,777

(22) PCT Filed: Apr. 1, 2014

(86) PCT No.: PCT/JP2014/059641
§ 371 (c)(1),
(2) Date: Oct. 1, 2015

(87) PCT Pub. No.: WO2014/163079
PCT Pub. Date: Oct. 9, 2014

(65) Prior Publication Data
US 2016/0039128 A1    Feb. 11, 2016

(30) Foreign Application Priority Data

Apr. 3, 2013   (JP) .................. 2013-078073

(51) Int. Cl.
| | | |
|---|---|---|
| *H01F 1/113* | (2006.01) | |
| *H01F 1/11* | (2006.01) | |
| *H01F 1/08* | (2006.01) | |
| *H01F 1/37* | (2006.01) | |
| *H01F 1/153* | (2006.01) | |
| *B29C 45/00* | (2006.01) | |
| *C01G 49/00* | (2006.01) | |
| *B29K 505/12* | (2006.01) | |
| *B29L 31/00* | (2006.01) | |

(52) U.S. Cl.
CPC ...... *B29C 45/0001* (2013.01); *C01G 49/0036* (2013.01); *H01F 1/11* (2013.01); *B29K 2505/12* (2013.01); *B29L 2031/00* (2013.01); *C01P 2004/61* (2013.01); *C01P 2006/12* (2013.01); *C01P 2006/42* (2013.01)

(58) Field of Classification Search
CPC . H01F 1/113; H01F 1/11; H01F 1/083; H01F 1/15375; H01F 1/37; H01F 41/0266; C01G 49/0036; C01G 49/00; C01G 49/0018; C01G 2004/61; C01G 2004/62; C01G 2006/42; B29C 45/0001; B29C 39/003

USPC ..... 252/62.54, 62.63, 62.51 R, 62.56, 62.62; 264/437

See application file for complete search history.

(56) References Cited

U.S. PATENT DOCUMENTS

| | | | |
|---|---|---|---|
| 3,036,008 A | 5/1962 | Godshalk | |
| 4,042,516 A * | 8/1977 | Matsumoto | ......... C04B 35/2683 |
| | | | 252/62.54 |
| 5,328,793 A | 7/1994 | Misawa et al. | |
| 5,578,670 A | 11/1996 | Nakazawa et al. | |
| 5,599,627 A | 2/1997 | Aoki et al. | |
| 6,017,631 A | 1/2000 | Yamamoto et al. | |
| 6,099,957 A | 8/2000 | Yamamoto et al. | |
| 6,383,407 B2 | 5/2002 | Ogata et al. | |
| 6,402,980 B1 | 6/2002 | Taguchi et al. | |
| 6,511,733 B2 | 1/2003 | Hayashi et al. | |
| 6,872,325 B2 | 3/2005 | Bandyopadhyay et al. | |
| 8,741,170 B2* | 6/2014 | Fujii | ........................ H01F 1/01 |
| | | | 252/62.63 |

(Continued)

FOREIGN PATENT DOCUMENTS

| | | |
|---|---|---|
| CN | 101345110 | 1/2009 |
| DE | 40 41 962 | 6/1992 |

(Continued)

OTHER PUBLICATIONS

International Search Report for PCT/JP2014/059641, dated Jul. 1, 2014, 4 pages.

(Continued)

*Primary Examiner* — Matthew E. Hoban
*Assistant Examiner* — Lynne Edmondson
(74) *Attorney, Agent, or Firm* — Nixon & Vanderhye P.C.

(57) ABSTRACT

The present invention relates to ferrite particles for bonded magnets and a resin composition for bonded magnets which can provide a bonded magnet molded product capable of realizing a high magnetic force and a complicated multipolar waveform owing to such a feature that the ferrite particles are readily and highly oriented against an external magnetic field in a flowing resin upon injection molding, as well as a bonded magnet molded product obtained by injection-molding the above composition. According to the present invention, there are provided ferrite particles for bonded magnets which have a crystallite size of not less than 500 nm as measured in an oriented state by XRD, and an average particle diameter of not less than 1.30 μm as measured by Fisher method; a resin composition for bonded magnets; and a molded product obtained by injection-molding the composition.

9 Claims, No Drawings

(56) References Cited

U.S. PATENT DOCUMENTS

| | | | |
|---|---|---|---|
| 9,691,528 B2 | 6/2017 | Nishio et al. | |
| 10,497,498 B2* | 12/2019 | Nishio | C08K 3/01 |
| 2002/0005603 A1 | 1/2002 | Tabuchi et al. | |
| 2002/0084001 A1 | 7/2002 | Iwasaki et al. | |
| 2002/0168523 A1 | 11/2002 | Uchida et al. | |
| 2004/0028592 A1 | 2/2004 | Akimoto et al. | |
| 2004/0094742 A1 | 5/2004 | Kawano et al. | |
| 2004/0241394 A1 | 12/2004 | Burrows | |
| 2006/0284136 A1 | 12/2006 | Takami et al. | |
| 2007/0099033 A1* | 5/2007 | Minachi | C04B 35/6261 428/836.1 |
| 2009/0218540 A1 | 9/2009 | Takami et al. | |
| 2009/0242164 A1* | 10/2009 | Gotoh | H01F 41/0266 164/498 |
| 2010/0028796 A1 | 2/2010 | Nakamura et al. | |
| 2010/0065771 A1* | 3/2010 | Fujii | H01F 1/113 252/62.54 |
| 2010/0124644 A1 | 5/2010 | Hein et al. | |
| 2010/0295643 A1 | 11/2010 | Nakaue et al. | |
| 2012/0015189 A1 | 1/2012 | Suenaga et al. | |
| 2014/0225023 A1 | 8/2014 | Fujii et al. | |
| 2015/0041702 A1 | 2/2015 | Nishio et al. | |
| 2016/0039128 A1* | 2/2016 | Nishio | H01F 1/11 252/62.54 |

FOREIGN PATENT DOCUMENTS

| | | |
|---|---|---|
| EP | 0 540 278 | 5/1993 |
| EP | 0 652 490 | 5/1995 |
| EP | 0 863 501 | 9/1998 |
| EP | 1 090 884 | 4/2001 |
| EP | 1 170 757 | 1/2002 |
| EP | 1 981 004 | 10/2008 |
| EP | 2 833 377 | 2/2015 |
| JP | 55-145303 | 11/1980 |
| JP | 61-191004 | 8/1986 |
| JP | 62-273573 | 11/1987 |
| JP | 63-55122 | 3/1988 |
| JP | 3-218606 | 9/1991 |
| JP | 5-144622 | 6/1993 |
| JP | 6-163237 | 6/1994 |
| JP | 6-192709 | 7/1994 |
| JP | 6-244047 | 9/1994 |
| JP | 8-115809 | 5/1996 |
| JP | 9-106904 | 4/1997 |
| JP | 2000-223307 | 8/2000 |
| JP | 2000-357606 | 12/2000 |
| JP | 2001-28305 | 1/2001 |
| JP | 2002-029829 | 1/2002 |
| JP | 2002-308629 | 10/2002 |
| JP | 2003-207950 | 7/2003 |
| JP | 2005-268729 | 9/2005 |
| JP | 2007-214510 | 8/2007 |
| JP | 2008-160052 | 7/2008 |
| JP | 2008-277792 | 11/2008 |
| JP | 2009-176960 | 8/2009 |
| JP | 2009-252906 | 10/2009 |
| JP | 2010-263201 | 11/2010 |
| KR | 10-2006-0060709 | 6/2006 |
| KR | 2008-0089226 | 10/2008 |
| WO | WO 2009/041606 | 4/2009 |
| WO | WO 2013/146299 | 10/2013 |

OTHER PUBLICATIONS

Extended European Search Report issued in App. No. 14778820.2 dated Sep. 26, 2016.
International Preliminary Report on Patentability issued in PCT/JP2014/059641 dated Oct. 6, 2015.
European Search Report for EP Application No. 08 25 1141 dated Oct. 7, 2008.
Extended European Search Report issued in App. No. 14850524.1 dated Mar. 14, 2017.
Extended European Search Report issued in Application No. 13767468.5 dated Nov. 5, 2015.
International Preliminary Examination Report in PCT/JP2013/057213 dated Oct. 9, 2014.
International Preliminary Report on Patentability issued in App. No. PCT/JP2014/076066 dated Apr. 5, 2016.
International Search Report for PCT/JP2013/057213 dated Jun. 4, 2013.
International Search Report for PCT/JP2014/076066 dated Jan. 13, 2015, 4 pages.
Office Action and English language translation of Office Action in JP 2008-088151 dated May 9, 2012.
Ozkän et al., "The Effect of $B_2O_3$ Addition on the Direct Sintering of Barium Hexaferrite," *Journal of the European Ceramic Society*, vol. 14: 351-358 (1994).
Liu et al., "Particle Rearrangement during Powder Compaction", Metallurgical and Materials Transactions A, vol. 32A, pp. 3117-3124. (Year: 2001).
Office Action issued in U.S. Appl. No. 15/025,599 dated Oct. 4, 2019.
Office Action issued in KR Appln. No. 10-2015-7025888 dated Apr. 24, 2020.
Final Office Action issued in U.S. Appl. No. 15/025,599 dated Jul. 12, 2018, 20 pages.

* cited by examiner

_US 11,820,055 B2_

FERRITE PARTICLES FOR BONDED MAGNETS, RESIN COMPOSITION FOR BONDED MAGNETS, AND MOLDED PRODUCT USING THE SAME

This application is the U.S. national phase of International Application No. PCT/JP2014/059641 filed 1 Apr. 2014, which designated the U.S. and claims priority to JP Patent Application No. 2013-078073 filed 3 Apr. 2013, the entire contents of each of which are hereby incorporated by reference.

TECHNICAL FIELD

The present invention relates to ferrite particles for bonded magnets and a resin composition for bonded magnets which are capable of producing a bonded magnet molded product having a good magnetic force and a good magnetic waveform by injection molding, as well as a bonded magnet molded product using the ferrite particles and the resin composition.

BACKGROUND ART

As well known in the art, bonded magnets have many advantages such as light weight, good dimensional accuracy, and facilitated mass-production of molded products having even a complicated shape as compared to sintered magnets, and, therefore, have been extensively used in various applications such as toys, office equipments, audio equipments and motors.

As the magnetic particles usable in the bonded magnets, there are known rare earth element magnet particles such as typically Nd—Fe—B-based alloy particles, or ferrite particles. The rare earth element magnet particles have high magnetic properties, but are expensive, resulting in limited applications thereof. On the other hand, the ferrite particles are somewhat deteriorated in magnetic properties as compared to the rare earth element magnet particles, but are inexpensive and chemically stable and, therefore, have been used in more extensive applications.

The bonded magnets have been usually produced by kneading a rubber or a plastic material with magnetic particles and then molding the resulting kneaded material in a magnetic field or by using a mechanical means.

In recent years, with the enhancement in performance of various materials or equipments including an improved reliability, there is also an increasing demand for a high performance of bonded magnets used therein including enhancement in strength and magnetic properties of the bonded magnets.

More specifically, the bonded magnet molded products obtained by injection molding, etc., are also required to exhibit a magnetic potential inherent to magnetoplumbite-type ferrite particles packed therein to a maximum extent. That is, since the ferrite particles have such a feature that they are easily and highly oriented against an external magnetic field, the bonded magnet molded products are capable of realizing a high magnetic force and a complicated multipolar waveform.

For example, in the applications of motors, rotors and sensors, the bonded magnet tends to be frequently subjected to multipolar magnetization when machined into various sizes and complicated shapes by injection molding. For this reason, in order to satisfy the multipolar magnetic waveform and magnetic force as desired, it has been strongly required that the ferrite particles exhibit a high orientation during flowing of the resin composition.

The magnet roll is essentially required to has a reduced size with reduction in size of an apparatus using the magnet roll. However, it may be difficult to ensure a high magnetic force of the magnet roll by reduction in volume of the magnet owing to the reduced size. By increasing the content of the ferrite particles in the magnet, it is possible to enhance magnetic potential thereof. However, in this case, it may be difficult to ensure the viscosity suitable for orientation of the ferrite particles. In addition, it may also be difficult to ensure the desired strength of the magnet roll due to the increase in content of the ferrite particles. For this reason, in order to satisfy the magnetic force and strength as desired, it has been strongly required that the ferrite particles exhibit a high orientation during flowing of the resin composition. Also, in addition to the enhancement in surface magnetic force, the uniformity in magnetic force on the surface of the magnet roll is particularly required as an important factor technology for obtaining clear images in copying machines, printers, etc.

For this reason, ferrite particles used in the bonded magnets as well as resin compositions for the bonded magnets which comprise the ferrite particles and an organic binder are also required to satisfy the above requirements.

Conventionally, ferrite particles for bonded magnets and resin compositions for bonded magnets which comprise the ferrite particles and the organic binder have been improved variously. For example, there are known the method of producing ferrite particles by using an alkali metal compound or an alkali earth metal compound as a flux (Patent Literature 1); the method of controlling a particle size distribution of ferrite particles (Patent Literature 2); the method of producing a bonded magnet using ferrite magnetic particles comprising an alkali earth metal as a constituting component and having an average particle diameter of not less than 1.50 μm and a melt flow rate of not less than 91 g/10 min (Patent Literature 3); the method of controlling properties of compacted calcined particles obtained by producing particles having an average particle diameter of not more than 2.5 μm and a specific surface area of not less than 1.25 $m^2/g$ and then subjecting the resulting particles to annealing and further to compaction, so as to satisfy the conditions of Ra<2.5 μm and Ra−Da<0.5 μm wherein Ra (μm) represents an average particle diameter of the particles as measured by a dry air dispersion laser diffraction method, and Da (μm) represents a specific surface area diameter of the particles as measured by an air permeability method (Patent Literature 4); the method of calcining a ferrite at a temperature of 1050 to 1300° C. under the saturated vapor pressure of a chloride, mixing the calcined ferrite with fine ferrite particles having a small particle diameter, and then annealing the resulting mixture at a temperature of 800 to 1100° C. to obtain a ferrite having a large particle diameter, a clear crystal structure, a coercive force that is hardly reduced even when pressed, and an energy product of not less than 2.0 MGOe (Patent Literature 5); or the like.

CITATION LIST

Patent Literature

Patent Literature 1: Japanese Patent Application Laid-Open (KOKAI) No. 55-145303
Patent Literature 2: Japanese Patent Application Laid-Open (KOKAI) No. 3-218606

Patent Literature 3: Japanese Patent Application Laid-Open (KOKAI) No. 2005-268729

Patent Literature 4: Japanese Patent Application Laid-Open (KOKAI) No. 2007-214510

Patent Literature 5: Japanese Patent Application Laid-Open (KOKAI) No. 2010-263201

SUMMARY OF INVENTION

Technical Problem

At the present time, the ferrite particles for bonded magnets and/or the resin compositions for bonded magnets which are capable of satisfying the above requirements have been strongly required. However, the ferrite particles and/or resin compositions capable of satisfying the above requirements to a sufficient extent have not been obtained until now.

That is, the bonded magnet molded products produced by using the ferrite particles or resin compositions for bonded magnets as described in the above Patent Literatures 1 to 5 have failed to provide those products which are excellent in all of high orientation property, high magnetic force and mechanical strength.

In consequence, an object or technical task of the present invention is to provide ferrite particles for bonded magnets and a resin composition for bonded magnets which are capable of producing a bonded magnet exhibiting a high orientation property, a high magnetic force and an excellent mechanical strength.

Solution to Problem

The above object or technical task of the present invention can be achieved by the following aspects of the present invention.

That is, according to the present invention, there are provided ferrite particles for bonded magnets which have a crystallite size of not less than 500 nm as measured in an oriented state by XRD, and an average particle diameter of not less than 1.30 μm as measured by Fisher method (Invention 1).

Also, according to the present invention, there are provided the ferrite particles for bonded magnets as described in the above Invention 1, wherein the ferrite particles have a mechanical orientation rate of not less than 0.84 as measured by EVA kneading-roll orientation evaluation (Invention 2).

Also, according to the present invention, there are provided the ferrite particles for bonded magnets as described in the above Invention 1 or 2, wherein the ferrite particles are magnetoplumbite-type ferrite particles (Invention 3).

In addition, according to the present invention, there is provided a resin composition for bonded magnets, comprising 83 to 93% by weight of the ferrite particles for bonded magnets as described in any one of the above Inventions 1 to 3, and 7 to 17% by weight of an organic binder component (Invention 4).

Further, according to the present invention, there is provided a molded product comprising the ferrite particles for bonded magnets as described in any one of the above Inventions 1 to 3, or the resin composition for bonded magnets as described in the above Invention 4 (Invention 5).

Also, according to the present invention, there is provided the molded product as described in the above Invention 5, wherein the molded product is obtained by injection molding (Invention 6).

Advantageous Effects of Invention

The ferrite particles for bonded magnets according to the present invention have such a powder characteristic that they have a crystallite size of not less than 500 nm as measured in an oriented state by XRD, and an average particle diameter of not less than 1.30 μm as measured by Fisher method. For this reason, by injection-molding a kneaded compound comprising the above particles, the magnetic particles exhibit a high orientation property and a high magnetic force, and are therefore suitable as magnetic particles for bonded magnets.

In the present invention, the "high orientation" as used herein means that assuming that the magnetic particles have the same ferrite content, not only the saturated magnetic flux density ($4\pi Is$) but also the residual magnetic flux density (Br) are high, but does not mean that only the orientation ratio (Br/$4\pi Is$) is high. Even though the orientation ratio is similar, if the saturated magnetic flux density ($4\pi Is$) itself is low, the residual magnetic flux density (Br) is also low, so that the magnetic particles fail to have a high orientation property.

The resin composition for bonded magnets according to the present invention is capable of providing a molded product that is excellent in mechanical strength and magnetic properties and therefore can be suitably used as a resin composition for bonded magnets.

DESCRIPTION OF EMBODIMENTS

The present invention is described in detail below.

First, the ferrite particles for bonded magnets according to the present invention (hereinafter referred to merely as "ferrite particles") are explained.

The composition of the ferrite particles according to the present invention is not particularly limited as long as they are in the form of a magnetoplumbite-type ferrite, and may be either Sr-based ferrite particles or Ba-based ferrite particles. In addition, the ferrite particles may also comprise different kinds of elements such as La, Nd, Pr, Co and Zn.

The particle shape of the ferrite particles according to the present invention is a plate shape, and preferably a generally hexagonal plate shape.

The ferrite particles according to the present invention have a crystallite size of not less than 500 nm as measured in an oriented state. When the crystallite size of the ferrite particles is less than 500 nm, the ferrite particles tend to have a low crystallinity, and also tend to exhibit a low mechanical orientation rate in EVA kneading-roll orientation evaluation. As a result, the ferrite particles tend to have an undesirable low magnetic force when injection-molded. The crystallite size of the ferrite particles in an oriented state is preferably 700 to 2000 nm, and more preferably 800 to 1800 nm.

The ferrite particles are orientable particles and therefore tend to lack in reproducibility of XRD measurement thereof in a non-oriented state. For this reason, in the present invention, the reproducibility of the XRD measurement of the ferrite particles is ensured by incorporating the ferrite particles in EVA in a completely oriented state. When the particles is held in such an oriented state, only the XRD peak on the oriented surface can be detected with a high reproducibility, and the crystallite size of the ferrite particles is calculated using a TOPAS software.

The mechanical orientation rate of the ferrite particles in EVA kneading-roll orientation evaluation according to the present invention is preferably not less than 0.84. When the mechanical orientation rate of the ferrite particles is less than 0.84, the ferrite particles tend to fail to have high orientation in the resin when injection-molded. The mechanical orientation rate of the ferrite particles in EVA kneading-roll orientation evaluation is more preferably not less than 0.85, and the upper limit of the mechanical orientation rate of the ferrite particles is 1.

The average particle diameter of the ferrite particles according to the present invention is 1.30 μm. When the average particle diameter of the ferrite particles is less than 1.30 μm, the resin composition comprising the ferrite particles tends to fail to ensure good viscosity suitable for the orientation (tends to be deteriorated in flowability), so that it may be difficult to produce a bonded magnet having high magnetic properties. The average particle diameter of the ferrite particles is preferably not less than 1.40 μm and more preferably not less than 1.50 μm. The average particle diameter of the ferrite particles is usually not more than 4.00 μm.

The BET specific surface area value of the ferrite particles according to the present invention is preferably 1.5 to 2.5 m$^2$/g.

The average thickness of the plate-shaped ferrite particles according to the present invention as measured by observation using a scanning electron microscope is preferably 0.2 to 1.0 μm. When the average thickness of the plate-shaped ferrite particles is out of the above-specified range, the resulting ferrite particles tend to be hardly packed with a high density when being formed into a bonded magnet, so that it may be difficult to produce a bonded magnet having high magnetic properties. The average thickness of the plate-shaped ferrite particles is more preferably 0.3 to 1.0 μm and still more preferably 0.4 to 0.7 μm.

The plate ratio (average plate diameter/thickness) of the ferrite particles according to the present invention is preferably 2.0 to 7.0 and more preferably 2.0 to 5.0 as measured by observation using a scanning electron microscope. When the plate ratio of the ferrite particles is controlled to the above-specified range, it is possible to allow the resin composition comprising the ferrite particles to flow in the direction parallel with the oriented surface of the particles.

The saturation magnetization value σs of the ferrite particles according to the present invention is preferably 65.0 to 73.0 Am$^2$/kg (65.0 to 73.0 emu/g), and the coercive force Hc of the ferrite particles is preferably 206.9 to 279 kA/m (2600 to 3500 Oe). In addition, Br of the ferrite particles is preferably 160 to 200 mT (1600 to 2000 G).

Next, the process for producing the ferrite particles according to the present invention is described.

The ferrite particles according to the present invention may be produced by blending and mixing raw material particles at a predetermined mixing ratio; molding the resulting mixture using a roller compactor; calcining the resulting molded product at a temperature of 900 to 1250° C. in atmospheric air and then subjecting the calcined particles to pulverization using a vibration mill and washing with water; and then subjecting the resulting particles to annealing heat treatment at a temperature of 700 to 1100° C. in atmospheric air.

The raw material particles may be appropriately selected from particles of oxides, hydroxides, carbonates, nitrates, sulfates, chlorides, etc., of various metals which are capable of forming a magnetoplumbite-type ferrite. Meanwhile, from the standpoint of improving a reactivity of the raw material particles upon calcining, the particle diameter of the raw material particles is preferably not more than 2.0 μm.

In addition, in the present invention, the mixed raw material particles are preferably calcined by adding a flux thereto. As the flux, there may be used various fluxes. Examples of the flux include $SrCl_2 \cdot 2H_2O$, $CaCl_2 \cdot 2H_2O$, $MgCl_2$, $KCl$, $NaCl$, $BaCl_2 \cdot 2H_2O$ and $Na_2B_4O_7$. The amount of the respective fluxes added is preferably 0.1 to 10 parts by weight and more preferably 0.1 to 8.0 parts by weight on the basis of 100 parts by weight of the mixed raw material particles.

Also, in the present invention, $Bi_2O_3$ may be added to and mixed in the mixed raw material particles or the particles obtained by calcining and then pulverizing the raw material particles.

Meanwhile, in the present invention, from the standpoint of well controlling the particle size distribution, larger particles and smaller particles may be used in the form of a mixture thereof.

The molding before the calcination is conducted using a roller compactor because it is important to compress and granulate the raw material mixture. The raw material mixture is forced between two rolls through a screw and compressed and granulated therebetween. The compression pressure of the pressing roll is preferably not less than 70 kg/cm$^2$, and more preferably not less than 80 kg/cm$^2$. As the distance between $Fe_2O_3$ and $SrCO_3$ as the raw materials becomes smaller, the ferritization reaction that is a solid state reaction tends to have a higher reactivity, and the diffraction peak intensity in XRD tends to be increased. Also, even under the same compression pressure condition, as the amount of the flux added which acts as the binder becomes larger, the bulk density of the granulated product is increased, which is desirable for the ferritization reaction. On the other hand, when the amount of the flux added is excessively large or when the combination of the fluxes and ratios thereof are inadequate, the crystallinity of the ferrite particles tends to be deteriorated. Meanwhile, when compressed and granulated, a very small amount of water may be added as the binder component.

In addition, in the present invention, after the calcination is conducted in a temperature range of 900 to 1250° C., the resulting calcined product is pulverized and subjected to annealing heat treatment in a temperature range of 700 to 1100° C. In this case, the pulverization is preferably conducted using a vibration mill. By conducting the pulverization using the vibration mill, it is possible to obtain the ferrite particles having desired properties as aimed by the present invention.

Next, the resin composition for bonded magnets using the ferrite particles according to the present invention is described.

The resin composition for bonded magnets according to the present invention can be produced by mixing and kneading the ferrite particles with an organic binder component and a silane coupling agent component such that the amount of the ferrite particles contained in the resin composition for bonded magnets is 83 to 93 parts by weight, and the total amount of the organic binder component and the silane coupling agent component contained in the resin composition for bonded magnets is 17 to 7 parts by weight.

The organic binder used in the present invention is not particularly limited as long as it may be usually used in conventional bonded magnets. The organic binder usable in the present invention may be appropriately selected from rubbers, vinyl chloride resins, ethylene-vinyl acetate copolymer resins, ethylene-ethyl acrylate copolymer resins, PPS resins, polyamide (nylon) resins, polyamide elastomers and polymeric fatty acid-based polyamides, depending upon the applications thereof. Among these organic binders, in the case where it is intended to preferentially achieve good strength and rigidity of the resulting molded product, the polyamide resins can be more suitably used. In addition, if required, a known mold release agent such as fatty acid metal salts or fatty acid amides may be added to the organic binder.

In the present invention, as the silane coupling agent, there may be used those silane coupling agents comprising, as functional groups, any one of a vinyl group, an epoxy group, an amino group, a methacryl group and a mercapto group, as well as any one of a methoxy group and an ethoxy group. Among these silane coupling agents, preferred are those silane coupling agents comprising an amino group and a methoxy group or those silane coupling agents comprising an amino group and an ethoxy group.

The resin composition for bonded magnets according to the present invention has a residual magnetic flux density Br of preferably not less than 230 mT (2300 G) and more preferably not less than 235 mT (2350 G), a coercive force iHc of preferably 206.9 to 278.5 kA/m (2600 to 3500 Oe) and more preferably 214.9 to 258.6 kA/m (2700 to 3250 Oe), and a maximum energy product BHmax of preferably not less than 10.3 kJ/m$^3$ (1.30 MGOe) and more preferably not less than 10.7 kJ/m$^3$ (1.35 MGOe), as measured by the below-mentioned methods for measuring magnetic properties.

Next, the process for producing the resin composition for bonded magnets by using the ferrite particles, the resin binder and the silane coupling agent according to the present invention is described.

The resin composition for bonded magnets according to the present invention may be produced by any suitable known processes used for producing the conventional resin compositions for bonded magnets. For example, the silane coupling agent, etc., may be added to and uniformly mixed with the ferrite particles according to the present invention, and then the organic binder component may be further uniformly mixed with the resulting mixture. Thereafter, the thus obtained mixture is melted and kneaded using a kneading extruder, etc., and the resulting kneaded material is pulverized or cut into granules or pellets.

The amount of the silane coupling agent added is 0.15 to 3.5 parts by weight and preferably 0.2 to 3.0 parts by weight on the basis of 100 parts by weight of the ferrite particles according to the present invention.

Next, the method of measuring the crystallite size of the ferrite particles in an oriented state in the XRD measurement according to the present invention is described.

After mixing 162.5 g (100 parts by weight) of the ferrite particles, 17.7 g (10.9 parts by weight) of EVA (ethylene-vinyl acetate copolymer resin) and 0.35 g (0.22 part by weight) of zinc stearate (produced by Sigma-Aldrich Co., LLC.) with each other, the resulting mixture was kneaded at 80° C. for 20 min using a plastomill "ME-5HP Model" (manufactured by Toyo Seiki Seisakusho Ltd.). After completion of the kneading, the resulting kneaded material was taken out of the plastomill and molded into a sheet shape having a thickness of 1.5 to 2.0 mm (in particular, 2.0 mm) by a twin roll "No. 88-43" (manufactured by Nishimura Koki Co., Ltd.) heated to a temperature of 60 to 63° C. (in particular, at 62° C.). The resulting sheet-like mixture was blanked into a cylinder shape, and two sheets of the cylindrical material were placed in a metal mold in which the material was melted at 155° C., and a magnetic field of 9 kOe was applied thereto 7 times in each of opposite directions. The molten material was allowed to stand while applying the magnetic field thereto until it was cooled to room temperature. The resulting test core was demagnetized using a demagnetizer and placed such that X-ray was incident on the oriented surface thereof to measure a crystallite size of the ferrite particles therein by XRD. Meanwhile, the crystallite size of the ferrite particles in a non-oriented state was measured by an ordinary X-ray diffraction method.

Next, the method of measuring mechanical orientation magnetic properties in EVA kneading evaluation according to the present invention is described.

After mixing 162.5 g (100 parts by weight) of the ferrite particles, 17.7 g (10.9 parts by weight) of EVA (ethylene-vinyl acetate copolymer resin) and 0.35 g (0.22 part by weight) of zinc stearate (produced by Sigma-Aldrich Co., LLC.) with each other, the resulting mixture was kneaded at 80° C. for 20 min using a plastomill "ME-5HP Model" (manufactured by Toyo Seiki Seisakusho Ltd.). After completion of the kneading, the resulting kneaded material was taken out of the plastomill and molded into a sheet shape having a thickness of 1.5 to 2.0 mm (in particular, 2.0 mm) by a twin roll "No. 88-43" (manufactured by Nishimura Koki Co., Ltd.) heated to a temperature of 60 to 63° C. (in particular, at 62° C.). The resulting sheet-like mixture was blanked into a cylinder shape, and five sheets of the cylindrical material while being kept in a warm state were placed in a metal mold in which the sheets were compressed and laminated together at a pressure of 1 t/cm$^2$, thereby obtaining a cylindrical bonded magnet. The resulting test core was subjected to measurement of mechanical orientation rate thereof using a BH tracer.

Next, the method of measuring magnetic field orientation magnetic properties in EVA kneading evaluation according to the present invention is described.

After mixing 162.5 g (100 parts by weight) of the ferrite particles, 17.7 g (10.9 parts by weight) of EVA (ethylene-vinyl acetate copolymer resin) and 0.35 g (0.22 part by weight) of zinc stearate (produced by Sigma-Aldrich Co., LLC.) with each other, the resulting mixture was kneaded at 80° C. for 20 min using a plastomill "ME-5HP Model" (manufactured by Toyo Seiki Seisakusho Ltd.). After completion of the kneading, the resulting kneaded material was taken out of the plastomill and molded into a sheet shape having a thickness of 1.5 to 2.0 mm (in particular, 2.0 mm) by a twin roll "No. 88-43" (manufactured by Nishimura Koki Co., Ltd.) heated to a temperature of 60 to 63° C. (in particular, at 62° C.). The resulting sheet-like mixture was blanked into a cylinder shape, and six sheets of the cylindrical material were placed in a metal mold in which the material was melted at 155° C., and a magnetic field of 9 kOe was applied thereto 7 times in each of opposite directions. The molten material was allowed to stand while applying the magnetic field thereto until it was cooled to room temperature. The resulting test core was subjected to measurement of magnetic properties thereof using a BR tracer.

Next, the test piece molded product for injection magnetism evaluation according to the present invention is described.

The test piece molded product may be produced by the following method. That is, the ferrite magnetic particles for bonded magnets, the organic binder component, etc., are previously uniformly mixed with each other, and/or melted and kneaded after being mixed together, and then pulverized or cut into pellets to prepare a resin composition for bonded magnets. The resulting resin composition is injected while being kept in a molten state into a cavity of a metal mold at 80° C., thereby obtaining the test core having a diameter of 25 mmϕ and a thickness of 10.5 mm.

The tensile strength of the test piece molded product for injection magnetism evaluation according to the present invention is preferably 70 to 250 MPa as measured according to ASTM D638.

The flexural strength of the test piece molded product for injection magnetism evaluation according to the present invention is preferably 30 to 100 MPa as measured according to ASTM D790.

It is preferred that the Izod impact strength of the test piece molded product for injection magnetism evaluation according to the present invention is preferably not less than 5 kJ/m$^3$ as measured according to ASTM D256, or the test piece molded product is not broken.

Function

The reason why not only the resin composition comprising the ferrite particles according to the present invention can ensure a good viscosity suitable for orientation of the ferrite particles, but also the molded product comprising the ferrite particles and/or the resin composition for bonded magnets according to the present invention can exhibit an excellent orientation property, by controlling the crystallite size of the ferrite particles to not less than 500 nm as measured in an oriented state in XRD measurement thereof, and controlling the average particle diameter of the ferrite particles to not less than 1.30 μm as measured by Fisher method, is considered by the present inventors as follows, although not clearly determined yet.

That is, it is considered that by controlling the crystallite size of the ferrite particles according to the present invention to not less than 500 nm as measured in XRD evaluation thereof and controlling the average particle diameter of the ferrite particles to not less than 1.30 μm as measured by Fisher method, the ferrite particles has such a particle shape that when injecting the resin composition into a mold cavity in a magnetic field, the ferrite particles therein are flowable in the direction parallel with the oriented surface thereof, and the ferrite particles also exhibit a good crystallinity so that the orientation of the ferrite particles against an external magnetic field can be facilitated.

It is considered that since the resin composition for bonded magnets according to the present invention comprises 83 to 93% by weight of the above ferrite particles for bonded magnets and 7 to 17% by weight of the organic binder component, the ferrite particles and the organic binder can be held in the resin composition under a uniform and ideal dispersion condition.

EXAMPLES

The typical examples of the present invention are described below.

The crystallite size of the ferrite particles according to the present invention was measured using TOPAS software produced by Bruker AXS K.K.

The average particle diameter of the ferrite particles according to the present invention was measured using "Sub-Sieve Sizer Model 95" manufactured by Thermo Fisher Scientific K.K.

The BET specific surface area of the ferrite particles according to the present invention was measured using a fully-automatic specific surface area analyzer "Macsorb model-1201" manufactured by Mountech Co., Ltd.

The compacted (compressed) density of the ferrite particles according to the present invention was determined as a density of the particles which was measured by compacting the particles under a pressure of 1 t/cm$^2$.

The saturation magnetic flux density Br and the coercive force iHc of the ferrite particles were determined as follows. That is, the particles were compacted by applying a pressure of 1 t/cm$^2$ thereto to obtain a compacted core, and then the magnetic properties of the thus obtained compacted core were measured in a magnetic field of 14 kOe using a "D.C. magnetization characteristic automatic recorder 3257" manufactured by Yokogawa Hokushin Denki Co., Ltd.

The melt mass flow rate (MFR) of the resin composition for bonded magnets was determined by melting the resin composition at 270° C. and measuring the MFR of the molten resin composition under a load of 10 kg, according to JIS K7210.

The molding density of a molded product produced from the resin composition for bonded magnets was determined as follows. That is, the resin composition for bonded magnets was melted in a cavity of a metal mold having a diameter of 25 mmϕ and a height of 10.5 mm to mold a core, and the density of the thus molded core was measured using an electronic specific gravity meter "EW-120SG" manufactured by Yasuda Seiki Seisakusho Co., Ltd.

The bench-molding magnetic properties of the resin composition for bonded magnets (including a residual magnetic flux density Br, a coercive force iHc, a coercive force bHc and a maximum energy product BHmax) were determined as follows. That is, the resin composition for bonded magnets was melted in a cavity of a metal mold having a diameter of 25 mmϕ and a height of 10.5 mm and magnetically oriented in a magnetic field of 9 kOe, and then the magnetic properties of the obtained molded product were measured in a magnetic field of 14 kOe using a "D.C. magnetization characteristic automatic recorder 3257" manufactured by Yokogawa Hokushin Denki Co., Ltd.

The test core used for measuring magnetic properties upon injection molding was obtained as follows. That is, the resin composition was injected using an injection molding machine "J20MII Model" manufactured by Nippon Seikosho Co., Ltd., at 260° C. while applying a magnetic field of 4.0 kOe thereto to obtain the test core having a diameter of 25.0 mm and a thickness of 10.5 mm. The injection pressures upon injection-molding the test core were recorded to evaluate the injection moldability of the resin composition.

The test piece used for measuring the strength was obtained as follows. That is, using an injection molding machine "J20MII Model" manufactured by Nippon Seikosho Co., Ltd., a test piece molded product having an overall length of 175 mm, an overall width of 12.5 mm and a thickness of 3.2 mm was obtained. The injection pressures upon injection-molding the test piece were recorded to evaluate the injection moldability of the resin composition.

The tensile strength was measured according to ASTM D638 Standard. Specifically, the test piece was prepared using an injection molding machine "J20MII Model" manufactured by Nippon Seikosho Co., Ltd., and then the tensile strength of the test piece was measured using a computer-aided measurement control system precision universal tester "AG-1" manufactured by Shimadzu Corp.

The flexural strength was measured according to ASTM D790 Standard. Specifically, the test piece was prepared using an injection molding machine "J20MII Model" manufactured by Nippon Seikosho Co., Ltd., and then the flexural strength of the test piece was measured using a computer-aided measurement control system precision universal tester "AG-1" manufactured by Shimadzu Corp.

The Izod impact strength was measured according to ASTM D256 Standard. Specifically, the test piece was prepared using an injection molding machine "J20MII Model" manufactured by Nippon Seikosho Co., Ltd., and then the Izod impact strength of the test piece was measured using an Izod impact tester "No. 158" manufactured by Yasuda Seiki Seisakusho Co., Ltd.

Example 1

Production of Ferrite Particles

One hundred thousand grams of powdery $\alpha\text{-Fe}_2\text{O}_3$ and 15900 g of $SrCO_3$ were weighed (molar ratio of Fe and Sr: 2Fe:Sr=5.95:1), mixed with each other in a wet attritor for 30 min, and then subjected to filtration and drying. An aqueous solution of $SrCl_2$ and an aqueous solution of $Na_2B_4O_7$ were respectively added and intimately mixed in the thus obtained raw material mixed particles, and the resulting mixture was then compressed and granulated under 90 Kg/cm$^2$ using a roller compactor. At this time, the amounts of $SrCl_2$ and $Na_2B_4O_7$ added were 2.5% by weight and 0.25% by weight, respectively, based on the weight of the above raw material mixed particles. The resulting granulated product was calcined in atmospheric air at 1150° C. for 2 hr. The resulting calcined product was coarsely crushed, and then pulverized by a wet attritor for 30 min, followed by subjecting the resulting particles to washing with water, filtration and drying. Thereafter, a mixed solution of isopropyl alcohol and triethanol amine was added to the particles, and further the particles were pulverized using a dry vibration mil for 30 min. At this time, the mixed solution was added in such an amount that the amounts of isopropyl alcohol and triethanol amine added were 0.2% by weight and 0.1% by weight, respectively, based on the above wet-pulverized dried product. Then, the resulting pulverized product was subjected to heat treatment in atmospheric air at 970° C. for 1.5 hr. The production conditions used above are shown in Table 1, and properties of the obtained magnetic particles for bonded ferrite magnets are shown in Table 2.

Example 2

The same procedure as in Example 1 was conducted except that the composition, kinds and amounts of additives added, etc., were changed variously, thereby producing ferrite particles.

The production conditions used above are shown in Table 1, and properties of the obtained magnetic particles for bonded ferrite magnets are shown in Table 2.

Comparative Examples 1 to 4

The composition, kinds and amounts of additives added, compression pressure upon granulation, etc., were changed variously, and a dry attritor was used in place of the dry vibration mill, thereby producing ferrite particles of Comparative Examples 1 to 4. The production conditions used above are shown in Table 1, and properties of the obtained magnetic particles for bonded ferrite magnets are shown in Table 2.

Example 3

Production of Resin Composition for Bonded Magnets

The ferrite particles obtained in Example 1 were weighed in an amount of 25000 g and charged into a Henschel mixer, and an aminoalkyl-based silane coupling agent was added thereto in an amount of 0.5 part by weight based on the weight of the ferrite particles and mixed with each other for 20 min until a uniform mixture was obtained. In addition, 11.98 parts by weight of a 12-nylon resin having a relative viscosity of 1.60 and 0.2 part by weight of a fatty acid amide were charged into the resulting mixture and further mixed with each other for 30 min, thereby preparing a mixture of a resin composition for bonded magnets.

The resulting mixture of the resin composition for bonded magnets was fed at a constant rate into a twin-screw kneader and kneaded therein at a temperature capable of melting the 12-nylon resin. The obtained kneaded material was taken out from the kneader in the form of strands, and cut into pellets having a size of 2 mm$\phi$×3 mm, thereby obtaining a resin composition for bonded magnets in the form of pellets.

The production method and properties of the thus obtained resin composition for bonded magnets are shown in Table 3.

Example 4

The resin composition for bonded magnets comprising the ferrite particles obtained in Example 2, the 12-nylon resin and the silane coupling agent was produced in the same manner as in Example 3 except for variously changing the amounts of the 12-nylon resin, the silane coupling agent and a release agent.

Properties of the thus obtained resin composition for bonded magnets are shown in Table 3.

Comparative Examples 5 to 7 (for Comparison with Example 3)

The resin compositions for bonded magnets comprising various obtained ferrite particles, the 12-nylon resin and the silane coupling agent were produced in the same manner as in Example 3.

Properties of the thus obtained resin composition for bonded magnets are shown in Table 3.

Comparative Example 8 (for Comparison with Example 4)

The resin composition for bonded magnets comprising obtained ferrite particles, the 12-nylon resin and the silane coupling agent was produced in the same manner as in Example 4.

Properties of the thus obtained resin composition for bonded magnets are shown in Table 3.

Example 5

Molding of Test Piece Molded Product

The resin composition for bonded magnets obtained in Example 3 was dried at 100° C. for 3 hr, melted at 280° C. in an injection molding machine, and injection-molded into a metal mold set at 80° C. for an injecting time of 0.3 sec, thereby preparing a test piece molded product having an overall length of 175 mm, an overall width of 12.5 mm and a thickness of 3.2 mm. The injection moldability and various properties of the thus prepared test piece molded product are shown in Table 4.

Example 6

The same procedure as in Example 5 was conducted except that the resin composition for bonded magnets prepared in Example 4 was used, thereby preparing a test piece molded product. The injection moldability and various properties of the thus prepared test piece molded product are shown in Table 4.

Comparative Examples 9 to 11

The same procedure as in Example 5 was conducted except that various resin compositions for bonded magnets were used instead, thereby preparing test piece molded products. The injection moldability and various properties of the thus prepared test piece molded products are shown in Table 4.

Comparative Example 12

The same procedure as in Example 6 was conducted except that resin compositions for bonded magnets were used instead, thereby preparing a test piece molded product. The injection moldability and various properties of the thus prepared test piece molded products are shown in Table 4.

TABLE 1

| Examples and Comparative Examples | Production of ferrite particles | | | |
|---|---|---|---|---|
| | Fe raw material | | Sr raw material | |
| | Kind | Amount (weight part) | Kind | Amount (weight part) |
| Example 1 | α-$Fe_2O_3$ | 100,000 | $SrCO_3$ | 15,900 |
| Example 2 | α-$Fe_2O_3$ | 100,000 | $SrCO_3$ | 16,020 |
| Comparative Example 1 | α-$Fe_2O_3$ | 100,000 | $SrCO_3$ | 15,900 |
| Comparative Example 2 | α-$Fe_2O_3$ | 100,000 | $SrCO_3$ | 16,020 |
| Comparative Example 3 | α-$Fe_2O_3$ | 100,000 | $SrCO_3$ | 15,900 |
| Comparative Example 4 | α-$Fe_2O_3$ | 100,000 | $SrCO_3$ | 15,900 |

| Examples and Comparative Examples | Production of ferrite particles | | | | |
|---|---|---|---|---|---|
| | 2Fe/Sr Molar ratio (—) | $SrCl_2$ | | $Na_2B_4O_7$ | |
| | | Amount (g) | Addition ratio (wt %) | Amount (g) | Addition ratio (wt %) |
| Example 1 | 5.95 | 2901 | 2.5 | 290 | 0.25 |
| Example 2 | 5.90 | 5221 | 4.5 | 348 | 0.30 |
| Comparative Example 1 | 5.95 | 3477 | 3.0 | 348 | 0.30 |
| Comparative Example 2 | 5.90 | 4061 | 3.5 | 580 | 0.50 |
| Comparative Example 3 | 5.95 | 8113 | 7.0 | 0 | 0 |
| Comparative Example 4 | 5.95 | 6375 | 5.5 | 580 | 0.50 |

| Examples and Comparative Examples | Production of ferrite particles | | | |
|---|---|---|---|---|
| | Granulation Pressure (Kg/cm²) | Calcination Calcination temperature (° C.) | Pulverization Mill | Heat treatment (° C.) |
| Example 1 | 90 | 1150 | Dry vibration mill | 970 |
| Example 2 | 70 | 1220 | Dry vibration mill | 950 |
| Comparative Example 1 | 70 | 1170 | Dry attritor | 970 |
| Comparative Example 2 | 50 | 1180 | Dry attritor | 970 |
| Comparative Example 3 | 50 | 1100 | Dry attritor | 970 |
| Comparative Example 4 | 50 | 1210 | Dry attritor | 950 |

TABLE 2

| Examples and Comparative Examples | XRD properties | | | Properties of particles | |
|---|---|---|---|---|---|
| | Crystallite size | | | Average particle diameter Ps-f (μm) | Average particle diameter Ps-b (μm) |
| | Non-oriented state (nm) | Oriented state (nm) | Non-oriented state (nm) | | |
| Example 1 | 215 | 910 | 215 | 1.57 | 1.24 |
| Example 2 | 250 | 1400 | 250 | 1.65 | 1.11 |
| Comparative Example 1 | 171 | 322 | 171 | 1.65 | 1.30 |
| Comparative Example 2 | 186 | 310 | 186 | 1.62 | 1.30 |
| Comparative Example 3 | 222 | 1120 | 222 | 1.21 | 0.93 |
| Comparative Example 4 | 235 | 319 | 235 | 1.75 | 1.29 |

| Examples and Comparative Examples | Properties of particles | | | | |
|---|---|---|---|---|---|
| | Compacted density CD (g/cm³) | Specific surface area BET (m²/g) | Particle shape (plate/thickness) (—) | Compact magnetic properties | |
| | | | | iHc (Oe) | Br (G) |
| Example 1 | 3.21 | 1.87 | 2-4 | 2950 | 1810 |
| Example 2 | 3.39 | 2.29 | 2-5 | 2760 | 1870 |
| Comparative Example 1 | 3.25 | 1.65 | 2-3 | 2950 | 1750 |
| Comparative Example 2 | 3.33 | 1.70 | 1-3 | 2790 | 1790 |
| Comparative Example 3 | 3.18 | 2.63 | 3-8 | 3480 | 1790 |
| Comparative Example 4 | 3.46 | 1.93 | 1-3 | 2880 | 1850 |

| Examples and Comparative Examples | EVA kneading magnetic properties Mechanical orientation | | |
|---|---|---|---|
| | Br (G) | 4πIs (G) | Br/4πIs (—) |
| Example 1 | 2400 | 2790 | 0.860 |
| Example 2 | 2330 | 2720 | 0.857 |
| Comparative Example 1 | 2240 | 2700 | 0.830 |
| Comparative Example 2 | 2250 | 2730 | 0.824 |
| Comparative Example 3 | 2380 | 2770 | 0.859 |
| Comparative Example 4 | 2220 | 2700 | 0.822 |

| Examples and Comparative Examples | EVA kneading magnetic properties Magnetic orientation (9 kOe) | | |
|---|---|---|---|
| | Br (G) | 4πIs (G) | Br/4πIs (—) |
| Example 1 | 2810 | 2890 | 0.972 |
| Example 2 | 2800 | 2870 | 0.976 |
| Comparative Example 1 | 2800 | 2880 | 0.972 |

TABLE 2-continued

| | | | |
|---|---|---|---|
| Comparative Example 2 | 2800 | 2860 | 0.979 |
| Comparative Example 3 | 2760 | 2880 | 0.958 |
| Comparative Example 4 | 2790 | 2880 | 0.969 |

TABLE 3

| Examples and Comparative Examples | Properties of resin composition for bonded magnets | | |
|---|---|---|---|
| | Kind of ferrite | MFR (g/10 min) | Molding density (g/cm$^3$) |
| Example 3 | Example 1 | 68 | 3.53 |
| Example 4 | Example 2 | 91 | 3.74 |
| Comparative Example 5 | Comparative Example 1 | 65 | 3.52 |
| Comparative Example 6 | Comparative Example 2 | 70 | 3.52 |
| Comparative Example 7 | Comparative Example 3 | 23 | 3.53 |
| Comparative Example 8 | Comparative Example 4 | 105 | 3.75 |

| Examples and Comparative Examples | Properties of resin composition for bonded magnets Bench-molding magnetism evaluation | | | | |
|---|---|---|---|---|---|
| | Br | | 4πIs | | Br/4πIs |
| | mT | G | mT | G | — |
| Example 3 | 278 | 2780 | 288 | 2880 | 0.965 |
| Example 4 | 299 | 2990 | 306 | 3060 | 0.977 |
| Comparative Example 5 | 276 | 2760 | 285 | 2850 | 0.968 |
| Comparative Example 6 | 275 | 2750 | 284 | 2840 | 0.968 |
| Comparative Example 7 | 278 | 2780 | 288 | 2880 | 0.965 |
| Comparative Example 8 | 298 | 2980 | 306 | 3060 | 0.974 |

| Examples and Comparative Examples | Properties of resin composition for bonded magnets Bench-molding magnetism evaluation | | | | |
|---|---|---|---|---|---|
| | bHc | | iHc | | BH$_{max}$ |
| | kA/m | Oe | kA/m | Oe | kJ/m$^3$ MGOe |
| Example 3 | 195.0 | 2450 | 246.7 | 3100 | 15.36 1.93 |
| Example 4 | 178.3 | 2240 | 206.9 | 2600 | 17.59 2.21 |
| Comparative Example 5 | 188.6 | 2370 | 232.4 | 2920 | 15.12 1.90 |
| Comparative Example 6 | 189.4 | 2380 | 238.7 | 3000 | 15.12 1.90 |
| Comparative Example 7 | 209.3 | 2630 | 308.0 | 3870 | 15.20 1.91 |
| Comparative Example 8 | 194.2 | 2440 | 237.1 | 2980 | 17.51 2.20 |

| Examples and Comparative Examples | Properties of resin composition for bonded magnets Injection-molding magnetism evaluation | | | | |
|---|---|---|---|---|---|
| | Br | | 4πIs | | Br/4πIs |
| | mT | G | mT | G | — |
| Example 3 | 281 | 2810 | 290 | 2900 | 0.969 |
| Example 4 | 302 | 3020 | 310 | 3100 | 0.974 |
| Comparative Example 5 | 274 | 2740 | 287 | 2870 | 0.955 |
| Comparative Example 6 | 271 | 2710 | 284 | 2840 | 0.954 |
| Comparative Example 7 | 268 | 2680 | 284 | 2840 | 0.944 |
| Comparative Example 8 | 293 | 2930 | 303 | 3030 | 0.967 |

| Examples and Comparative Examples | Properties of resin composition for bonded magnets Injection-molding magnetism evaluation | | | | |
|---|---|---|---|---|---|
| | bHc | | iHc | | BH$_{max}$ |
| | kA/m | Oe | kA/m | Oe | kJ/m$^3$ MGOe |
| Example 3 | 204.5 | 2570 | 260.2 | 3270 | 15.44 1.94 |
| Example 4 | 181.4 | 2280 | 210.9 | 2650 | 17.51 2.20 |
| Comparative Example 5 | 192.6 | 2420 | 238.7 | 3000 | 14.72 1.85 |
| Comparative Example 6 | 188.6 | 2370 | 240.3 | 3020 | 14.33 1.80 |
| Comparative Example 7 | 202.9 | 2550 | 312.7 | 3930 | 13.94 1.75 |
| Comparative Example 8 | 177.5 | 2230 | 209.3 | 2630 | 16.79 2.11 |

TABLE 4

| Examples and Comparative Examples | Resin composition for bonded magnets | Various properties of dumbbell test piece molded product | | |
|---|---|---|---|---|
| | | Flexural strength (MPa) | Tensile strength (MPa) | Izod impact strength (kJ/m$^2$) |
| Example 5 | Example 3 | 127.0 | 64.0 | NB |
| Example 6 | Example 4 | 90.3 | 47.0 | 10.2 |
| Comparative Example 9 | Comparative Example 5 | 126.0 | 61.5 | NB |
| Comparative Example 10 | Comparative Example 6 | 130.0 | 63.0 | NB |
| Comparative Example 11 | Comparative Example 7 | 124.4 | 65.9 | 21.4 |
| Comparative Example 12 | Comparative Example 8 | 93.6 | 47.6 | 11.4 |

As shown in Table 3, the molded product obtained by injection-molding the resin composition for bonded magnets according to the present invention had a residual magnetic flux density of not less than 230 mT (2300 G), 4πIs of not less than 230 mT (2300 G), Br/4πIs of not less than 0.96, a coercive force iHc of 206.9 to 278.5 kA/m (2600 to 3500 Oe), and a maximum energy product BH$_{max}$ of not less than 10.3 kJ/m$^3$ (1.30 MGOe).

Thus, it was confirmed that the injection-molded cores produced according to the present invention were excellent in orientation properties as compared to those of Comparative Examples.

INDUSTRIAL APPLICABILITY

The bonded magnet obtained by using the ferrite particles and/or the resin composition for bonded magnets according to the present invention exhibits a high orientation property and a high magnetic force, and is excellent in both flexural strength and magnetic properties, and therefore the ferrite particles and/or the resin composition according to the present invention can be suitably used as ferrite particles and/or a resin composition for bonded magnets, in particular, as those for a magnet roll.

The invention claimed is:

1. Ferrite particles for bonded magnets, having a crystallite size of 500 nm to 1400 nm as measured in an oriented state by XRD, and an average particle diameter of 1.30 to 1.65 µm as measured by Fisher method, wherein the ferrite particles are magnetoplumbite-type ferrite particles.

2. A cylindrical bonded magnet comprising ferrite particles for bonded magnets having a crystallite size of 500 nm to 1400 nm as measured in an oriented state by XRD, and an average particle diameter of 1.30 to 1.65 µm as measured by Fisher method, wherein the cylindrical bonded magnet has a mechanical orientation rate of not less than 0.84 as measured by EVA kneading-roll orientation evaluation, the EVA kneading-roll orientation evaluation comprising the following steps:
mixing 162.5 g (100 parts by weight) of the ferrite particles, 17.7 g (10.9 parts by weight) of EVA (ethylene-vinyl acetate copolymer resin) and 0.35 g (0.22 part by weight) of zinc stearate with each other,
kneading the resulting mixture at 80° C. for 20 min using a plastomill,
molding the kneaded material into a sheet shape having a thickness of 1.5 to 2.0 mm by a twin roll heated to a temperature of 60 to 63° C.,
blanking the molded material into a cylinder shape,
placing five sheets of the cylindrical shapes while being kept in a warm state in a metal mold in which the sheets are compressed and laminated together at a pressure of 1 t/cm$^2$, thereby obtaining the cylindrical bonded magnet, and
measuring the mechanical orientation rate of the cylindrical bonded magnet using a BH tracer.

3. A resin composition for bonded magnets, comprising 83 to 93% by weight of the ferrite particles for bonded magnets as claimed in claim 1, and 7 to 17% by weight of an organic binder component.

4. A molded product comprising the resin composition for bonded magnets as claimed in claim 3.

5. The molded product according to claim 4, wherein the molded product is obtained by injection molding.

6. The ferrite particles for bonded magnets according to claim 1, wherein the particle shape of the ferrite particles is a plate shape.

7. The ferrite particles for bonded magnets according to claim 6, wherein the particle shape of the ferrite particles is a hexagonal plate shape.

8. The ferrite particles for bonded magnets according to claim 6, wherein the average thickness of the plate-shaped ferrite particles as measured by observation using a scanning electron microscope is 0.2 to 1.0 µm.

9. The ferrite particles for bonded magnets according to claim 6, wherein the plate ratio (average plate diameter/thickness) of the ferrite particles is 2.0 to 7.0 as measured by observation using a scanning electron microscope.

* * * * *